(12) United States Patent
Joyce et al.

(10) Patent No.: US 8,977,963 B1
(45) Date of Patent: Mar. 10, 2015

(54) IN PLACE EXPANSION OF AGGREGATED VIEWS

(75) Inventors: Paul Joyce, Menlo Park, CA (US);
Jeffrey David Yaksick, Mount Hamilton, CA (US); John Howard Palevich, Medina, WA (US); Ming Jia, Sunnyvale, CA (US); Renaud-Roland Hubert, Gilroy, CA (US); Neel B. Parekh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 513 days.

(21) Appl. No.: 13/285,420

(22) Filed: Oct. 31, 2011

(51) Int. Cl.
*G06F 3/00* (2006.01)
*G06F 3/048* (2013.01)

(52) U.S. Cl.
USPC .......................... 715/716; 715/810; 715/764

(58) Field of Classification Search
USPC .......................... 715/810; 810/764; 716/716
See application file for complete search history.

(56) References Cited

U.S. PATENT DOCUMENTS

| | | | |
|---|---|---|---|
| 6,880,132 B2 | 4/2005 | Uemura | |
| 7,328,411 B2* | 2/2008 | Satanek | 715/786 |
| 7,409,644 B2 | 8/2008 | Moore et al. | |
| 2004/0268451 A1* | 12/2004 | Robbin et al. | 999/999.999 |
| 2007/0162298 A1 | 7/2007 | Melton et al. | |
| 2008/0307359 A1* | 12/2008 | Louch et al. | 715/835 |
| 2009/0172532 A1* | 7/2009 | Chaudhri | 715/702 |
| 2010/0058244 A1* | 3/2010 | Wang | 715/838 |
| 2010/0229088 A1 | 9/2010 | Nakajima et al. | |
| 2011/0218983 A1* | 9/2011 | Chaney et al. | 707/705 |

OTHER PUBLICATIONS

Microsoft Corp, Microsoft Windows 7 Sp1, Microsoft Corp, Dec. 2009, Microsoft Corp, pp. 1-7.*

* cited by examiner

*Primary Examiner* — Amy Ng
*Assistant Examiner* — Erik Stitt
(74) *Attorney, Agent, or Firm* — Shumaker & Sieffert, P.A.

(57) ABSTRACT

A method includes outputting a first graphical representation corresponding to a first group of one or more audio files and a second graphical representation corresponding to a second group of one or more audio files, wherein the first group is defined based on a respective first metadata attribute value for each audio file from the first group; receiving a user selection of the first graphical representation; and, in response to the user selection, moving the second graphical representation, thereby defining an expansion area, and outputting, within the expansion area, at least one additional graphical representation corresponding to a subgroup of the first group, wherein the subgroup is defined based at least in part on a respective second metadata attribute value for each audio file from the subgroup.

25 Claims, 5 Drawing Sheets

IN PLACE EXPANSION OF AGGREGATED VIEWS

BACKGROUND

Computing devices can be utilized to collect and organize information, such as multimedia information stored as one or more files. As an example, many computing devices allow users to store songs in digitally-encoded media files for playback by the computing device and/or for transmission to and playback on another device. Examples of such devices include personal computers, tablet computing devices, dedicated music player devices, and mobile telephones. With some products, a user can define one or more libraries of audio files (e.g., song recordings) that are stored on a device by, for example, purchasing the audio files from online music stores and/or copying the music from compact discs or other media. These audio files are then generally accessible on the device and can be played back by the user on demand.

In some systems, each audio file can be described and categorized based on a number of attributes such as genre, artist name, album name, song name, length, bitrate, file type, etc. These descriptions are typically stored as metadata, and can be used to organize and browse libraries of audio files. Some user interfaces for interacting with such libraries can include an aggregated view that groups audio files by an attribute. Typically, selection of an object representing the attribute presents a new view in which the audio files corresponding to the attribute are displayed. In some such user interfaces, one or more of the audio files can be selected by the user for playback.

SUMMARY

Disclosed herein are methods, apparatuses, and computer readable media for in place expansion of aggregated views.

One aspect of the embodiments taught herein is a method that includes outputting, at a display of a computing device, a first graphical representation corresponding to a first group of one or more audio files from a plurality of audio files and a second graphical representation corresponding to a second group of one or more audio files from the plurality of audio files, wherein the first group is defined based on a respective first metadata attribute value for each audio file from the first group; receiving, at the computing device, a user selection of the first graphical representation, wherein the first graphical representation is displayed at a first location of the display; and, in response to the user selection, moving the second graphical representation from a second location of the display to a third location of the display, thereby defining an expansion area adjacent to the first location of the display, and outputting, within the expansion area, at least one additional graphical representation corresponding to a subgroup of the first group, wherein the subgroup is defined based at least in part on a respective second metadata attribute value for each audio file from the subgroup.

Another aspect of the embodiments taught herein is an apparatus that includes a display device; an input device; a processor; and a library manager that is executed by the processor. The library manager is operable to output, at the display device, a first graphical representation corresponding to a first group of one or more audio files from a plurality of audio files and a second graphical representation corresponding to a second group of one or more audio files from the plurality of audio files, wherein the first group is defined based on a respective first metadata attribute value for each audio file from the first group; receive, at the input device, a user selection of the first graphical representation, wherein the first graphical representation is displayed at a first location of the display; and, in response to the user selection, move the second graphical representation from a second location of the display to a third location of the display, thereby defining an expansion area adjacent to the first location of the display, and output, within the expansion area, at least one additional graphical representation corresponding to a subgroup of the first group, wherein the subgroup is defined based at least in part on a respective second metadata attribute value for each audio file from the subgroup.

Another aspect of the embodiments taught herein is a non-transitory computer readable medium that includes program instructions that are executable by one or more processors. When executed by the one or more processors, the program instructions cause the one or more processors to perform operations. The operations include outputting, at a display of a computing device, a first graphical representation corresponding to a first group of one or more audio files from a plurality of audio files and a second graphical representation corresponding to a second group of one or more audio files from the plurality of audio files, wherein the first group is defined based on a respective first metadata attribute value for each audio file from the first group; receiving a user selection of the first graphical representation, wherein the first graphical representation is displayed at a first location of the display; and in response to the user selection: moving the second graphical representation from a second location of the display to a third location of the display, thereby defining an expansion area adjacent to the first location of the display, and outputting, within the expansion area, at least one additional graphical representation corresponding to a subgroup of the first group, wherein the subgroup is defined based at least in part on a respective second metadata attribute value for each audio file from the subgroup.

BRIEF DESCRIPTION OF THE DRAWINGS

The description herein makes reference to the accompanying drawings wherein like reference numerals refer to like parts throughout the several views.

DETAILED DESCRIPTION

Navigation of a collection of files using a traditional aggregated view typically requires navigating up and down through hierarchical levels. Transitions between hierarchical levels interrupt a user's browsing experience. In-place expansion of a grouping in an aggregated view, as disclosed herein, provides a more seamless navigation experience, thereby increasing usability and user satisfaction.

Figure 1:
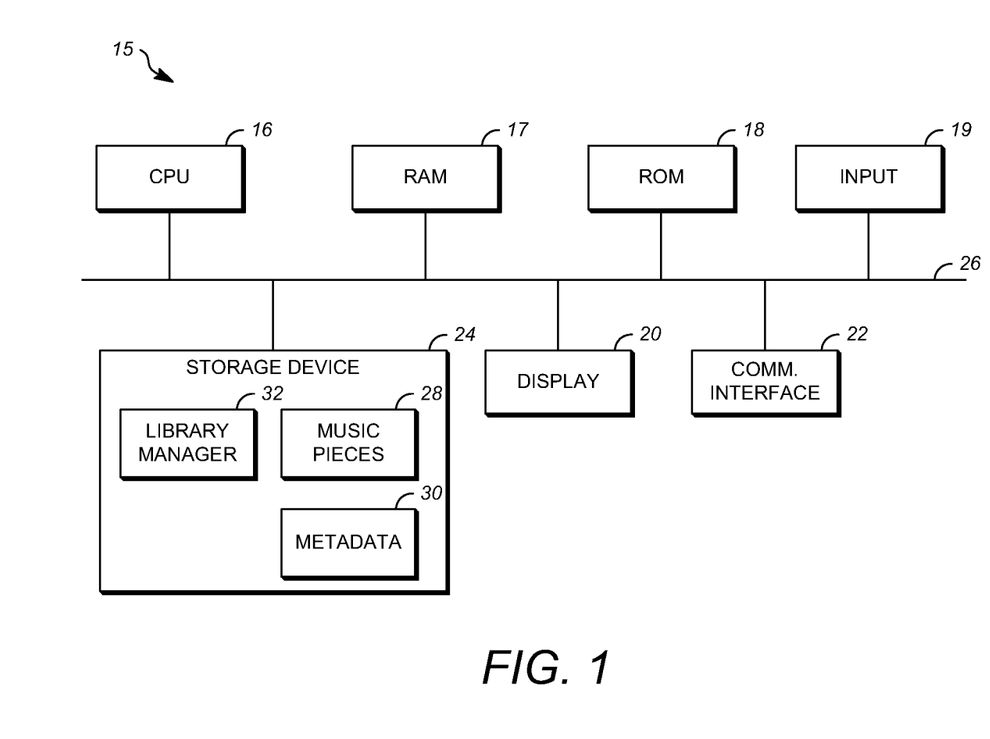
FIG. 1 is a block diagram showing an example implementation of in place expansion of aggregated views using a device.

An example implementation of in-place expansion of an aggregated view uses a device 15. The device 15 can be an electronic computing device. As examples, the device 15 can be a cellular telephone with computing functionality (i.e. a "smartphone"), a tablet computer, a laptop computer, a desktop computer, a portable music player, etc.

The device 15 can include one or more processors such as a central processing unit (CPU) 16 and memory such as RAM 17 and ROM 18. One or more input devices 19, such as a keyboard and mouse, a touch screen interface, etc., can allow user input to be provided to the CPU 16. A display 20, such as a liquid crystal display (LCD), a cathode-ray tube (CRT) or other suitable type of display device, can allow output to be presented to the user. A communications interface 22 can be any manner of wired or wireless means of communication that is operable to send and receive data or other signals using a network of any type. A storage device 24 can be provided in the form of any suitable computer readable medium, such as a hard disk drive, a solid state drive, a memory card, removable media, etc. The CPU 16, the RAM 17, the ROM 18, the storage device 24, the input devices 19, the display 20 and the communications interface 22 can all be connected to one another by a bus 26.

As an example the storage device 24 can be used to store a plurality of audio files 28 and a plurality of metadata attributes 30. The metadata attributes 30 can be data that relates to each of the audio files 28. The metadata attributes 30 can be encoded within each of the audio files 28, such that each audio file 28 contains its own metadata attributes 30. Alternatively, the metadata attributes 30 could be encoded separately from the audio files 28.

As used herein, "audio file" refers to an audio recording. In some examples, an audio file can be an audio track of definite length. An audio file can correspond to a single musical composition. However, the term "audio file" can encompass works other than musical compositions, such as an audio book, a portion of an audio book, a lecture, a conversation, a recording of ambient noise in a given environment, or any other type of sound recording.

The audio files 28 can be encoded in a computer-interpretable format. One well-known format by which audio files 28 can be encoded in a computer interpretable format is the MPEG-1 or MPEG-2 Audio Layer III format, which is commonly referred to as MP3 format. Other audio encoding formats, public or proprietary, now known or later developed can be utilized as a basis for encoding the audio files 28.

The metadata attributes 30 can describe one or more attributes of the audio files 28. The attributes described by the metadata attributes 30 can include the genre, artist name, album name, track name and track number for each of the audio files 28.

The metadata attributes 30 can be stored in a metadata container that is a portion of each audio file 28. One example of storage of the metadata attributes 30 within each music piece 28 is an ID3 format tag, which is commonly appended to MP3 format media files. As an alternative, the metadata attributes 30 can be in the form of one or more files that can be stored separately from the audio files 28 in the storage device 24. One example of storage of the metadata attributes 30 separate from the audio files 28 is an index file that contains the metadata attributes 30 for some or all of the audio files 28. An XML format file can be used for this purpose.

A library manager 32 can be encoded in a non-transitory computer readable medium, such as the storage device 24, in any tangible form. The library manager 32 can include program instructions that are executable by one or more processors, such as the CPU 16 of the device 15, that, when executed, cause the one or more processors to perform the functions and operations that are described herein.

The library manager 32 can be configured to manage storage of the audio files 28 and the metadata attributes 30 on the storage device 24. The library manager 32 can also be operable to define an aggregated view representing the audio files 28 based on the metadata attributes 30. The aggregated view that is defined and caused to be displayed by the library manager 32 allows a user to navigate a collection of the audio files 28 and select one or more of the audio files 28 for playback. Other functions can be provided by the library manager 32.

Figure 2:
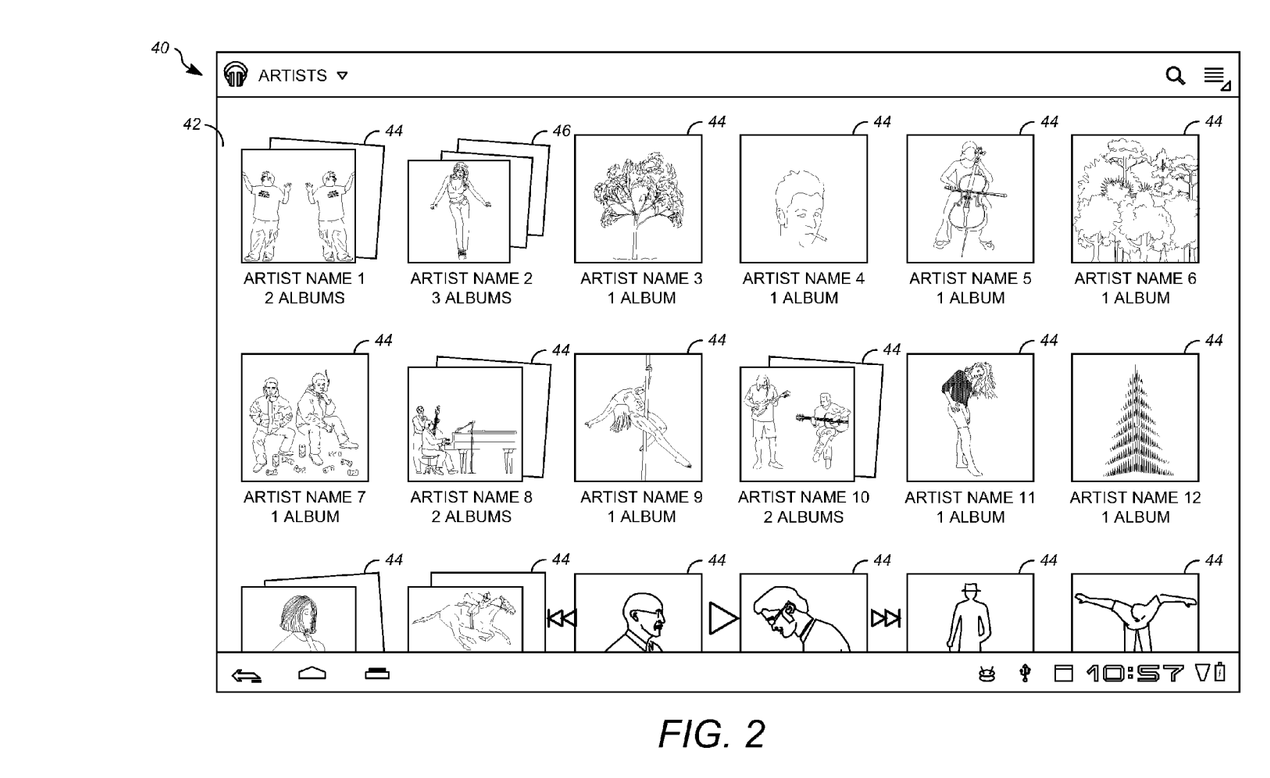
FIG. 2 is an illustration showing an aggregated view.

FIG. 2 shows a user interface 40. At least part of the user interface 40 can be defined, output, and caused to be displayed by the library manager 32. The user interface 40 can include a display area 42, in which the aggregated view representing the audio files 28 can be displayed.

The aggregated view can include one or more graphical representations that each represents a group of one or more of the audio files 28. The library manager 32 can define the aggregated view at an artist-level by defining a plurality of artist-level groups 44 based on the metadata attributes 30, each of which is represented by a graphical representation that can be displayed within the display area 42.

The library manager 32 can define the artist-level groups 44 by grouping the audio files 28 based on an artist name attribute of the metadata attributes 30 for each of the audio files 28. When two or more of the audio files 28 have the same value for the artist name attribute, as defined by the metadata attributes 30, those audio files 28 can be assigned to a common artist-level group 44.

The library manager 32 can define the graphical representations for each of the artist-level groups 44. As an example, album cover art corresponding to the artist associated with each artist-level group 44 can be used as the graphical representation for that artist-level group 44. The album cover art can be stored, for example, as an attribute of the metadata attributes 30 for each of the audio files 28.

In the illustrated example, textual information appears below each of the artist-level groups 44. For example, the name of the artist that is represented by the artist-level group 44 can be displayed near the graphical representation of each of the artist-level groups 44. The number of albums represented by an artist-level group 44 can also be displayed as textual information that appears near each artist-level group 44. In the illustrated example, graphical representations of artist-level groups 44 and their associated textual information are visible. Additional artist-level groups 44 are partially visible and could be made viewable in response to a user-initiated input (e.g., scrolling).

The example aggregated view shown in FIG. 2 includes graphical representations for artist-level groups 44 that are designated as Artist Name 1 through Artist Name 12. The number of albums within each artist-level group 44 can be indicated in the textual information that can be provided in the aggregated view. The number of albums represented by an artist-level group 44 can be determined by the library manager 32 based on the metadata attributes 30 associated with the audio files 28 in each artist-level group 44. When an artist-level group 44 includes more than one album, it can be designated by a graphical representation having the appearance of a stack. As an example, the graphical representations for artist-level groups 44 having multiple albums can have the appearance of a stack of albums having album cover art corresponding to the individual albums in the artist-level group 44. This is shown in FIG. 2 with respect to the artist-level groups 44 designated by Artist Name 1, Artist Name 2, Artist Name 8, and Artist Name 10.

In the illustrated example, graphical representations for the artist-level groups 44 are arranged in a rectangular grid. Other arrangements can be utilized.

Each of the artist-level groups 44 can be expanded in place. Expansion of the artist-level groups 44 can be performed in response to a user selection of one of the artist-level groups 44. The user selection can be, for example, a mouse click or a touch input. As an example, the artist-level group 44 designated as Artist Name 2 can be identified by a user selection requesting expansion and will be referred to herein as a selected group 46. The selected group 46 is a group that is selected by the user. The location of the selected group 46 with respect to the remainder of the artist-level groups 44 in the aggregated view of FIG. 2 will be referred to herein as a selected location. Thus, the selected group 46 can be located at the selected location.

Figure 3:
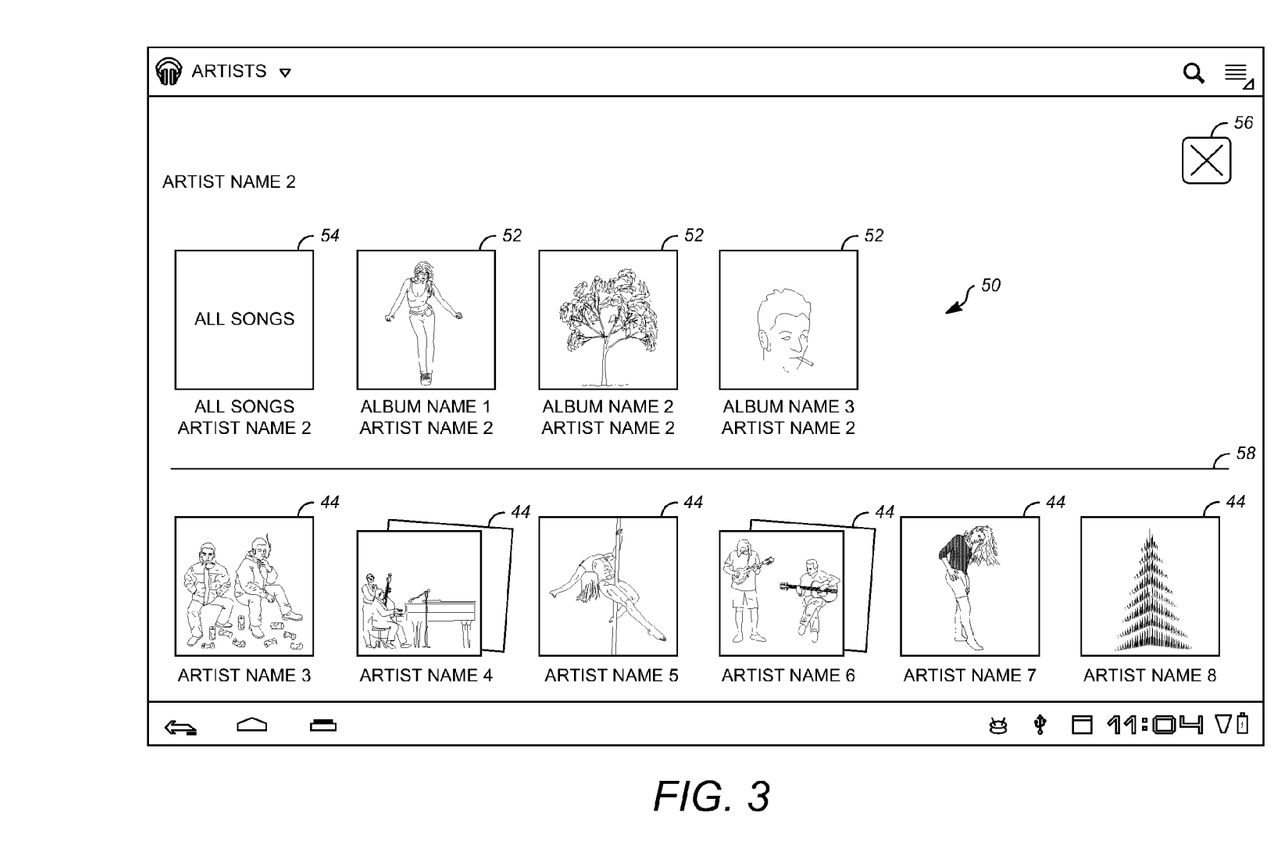
FIG. 3 is an illustration showing a first example of an expanded aggregated view.

In response to the user selection requesting expansion of the selected group 46, the graphical representation of the selected group 46 can be removed by the library manager 32, and the graphical representations of at least some of the artist-level groups 44 can be moved away from the selected location. As an example, the graphical representation for the artist-level group 44 can be moved upward off of the viewable portion of the display area 42, while the artist-level groups 44 that appear after the selected group 46 and the aggregated view, namely, the artist-level groups 44 designated by Artist Name 3 through Artist Name 12, can be moved downward. Thus, in this example, a subgroup of the artist-level groups 44 including the artist-level group 44 designated by Artist Name 1 can be moved upward, while another subgroup of the artist-level groups 44, including the artist-level groups 44 designated by Artist Name 3 through Artist Name 12 are moved downward. Moving the graphical representations for these subgroups of the artist-level groups 44 define an expansion area 50 within the display area 42, as shown in FIG. 3.

The library manager 32 populates the expansion area 50 with graphical representations of a plurality of album level groups 52 that correspond to the selected group 46. The album-level groups 52 can be defined by the library manager 32 based on an album name attribute of the metadata attributes 30 of each of the audio files 28 in the selected group 46. Each of the album-level groups 52 can include one or more of the audio files 28 that share common values both for the artist name attribute and the album name attribute of the metadata attributes 30.

The library manager 32 can optionally define an all-songs group 54. The all-songs group 54 can include audio files 28 having an artist name attribute corresponding to the artist name of the selected group 46, regardless of the album name attribute or other attributes of the metadata attributes 30 associated with each of the audio files 28. The all-songs group 54 can be represented by a graphical representation that is displayed within the expansion area 50 along with the graphical representations that correspond to the album-level groups 52.

A close button 56 can be displayed near the album-level groups 52 and can be displayed with the expansion area 50. As one example, the close button 56 can be positioned within the expansion area 50. As another example, the close button can be positioned near the expansion area 50. The close button 56 can be operable to receive a user selection that requests contraction of the expanded view including the album-level groups 52. User selection of the close button 56 will return the display area 42 to the previous level in its expansion hierarchy, such as the aggregated view of FIG. 2, which shows only the artist-level groups 44. In response to user selection of the close button 56, the library manager 32 can remove the graphical representations of the album-level groups 52 from the expansion area 50. The graphical representation corresponding to the selected group 46 is then displayed at the selected location, and the remainder of the graphical representations of the artist-level groups 44 can be moved toward the selected location to remove the expansion area 50.

Figure 4:
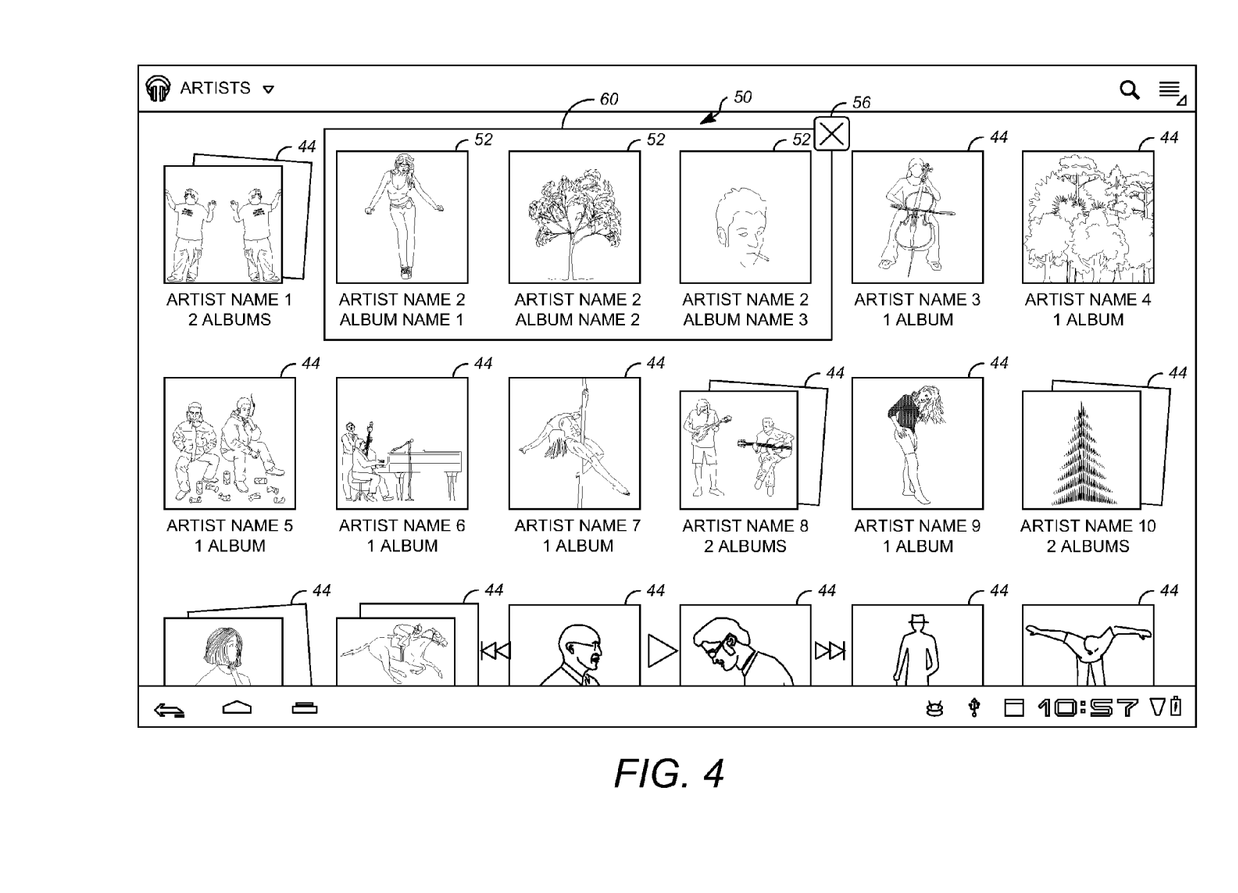
FIG. 4 is an illustration showing a second example of an expanded aggregated view.

In the example of the expansion area 50 shown in FIG. 3, a horizontal separator 58, such as a line or other graphical element, is positioned below the album-level groups 52, and the artist-level groups 44 that previously appeared to the left and right of the selected location are displaced upward or downward. In another example, the subgroup of the artist-level groups 44 that is located before the selected location need not be moved upward, and the subgroup of the artist-level groups 44 that are positioned after the selected location need not be moved downward. As shown in FIG. 4, the expansion area 50 can be positioned so that artist-level groups 44 may remain present to the left and the right of the album-level groups 52 that are present within the expansion area 50. In order to define the expansion area 50, the artist-level groups 44 that are positioned after the selected location are displaced rightward and downward by the number of additional spaces required to define the expansion area 50. In this example, the extent of the expansion area 50 are indicated by a graphical element such as a frame 60 in the form of a rectangle defined by lines or shading, but the frame 60 need not be included, and other visual cues could be provided to indicate that the view of the selected group 46 has been expanded to show the album-level groups 52.

The transition from the aggregated view of FIG. 2 to the expanded aggregated view of FIG. 3 or the expanded aggregated view of FIG. 4 can include an animated movement of some or all of the graphical representations of the artist-level groups 44. Each of the artist-level groups 44 that is moved to define the expansion area 50 can move along an animation path that extends directly from its initial position to its final position or along any arbitrary path. This provides a visual cue to the user that the current view is being modified, not replaced by a new view.

In the examples disclosed above, the audio files 28 and the metadata attributes 30 are described as being stored on the storage device 24. Other configurations are possible. For example, either or both of the audio files 28 and the metadata attributes 30 can be stored on a server that is connected to the device 15 by a network, which can be any kind or kinds of communications means capable of transmitting data or signals, such as the internet, which is a packet-switched network, a local area network (LAN), wide area network (WAN), virtual private network (VPN), or any other means of transferring data. In such a configuration, the library manager could be part of web application that is transmitted to the device by a server.

Figure 5:
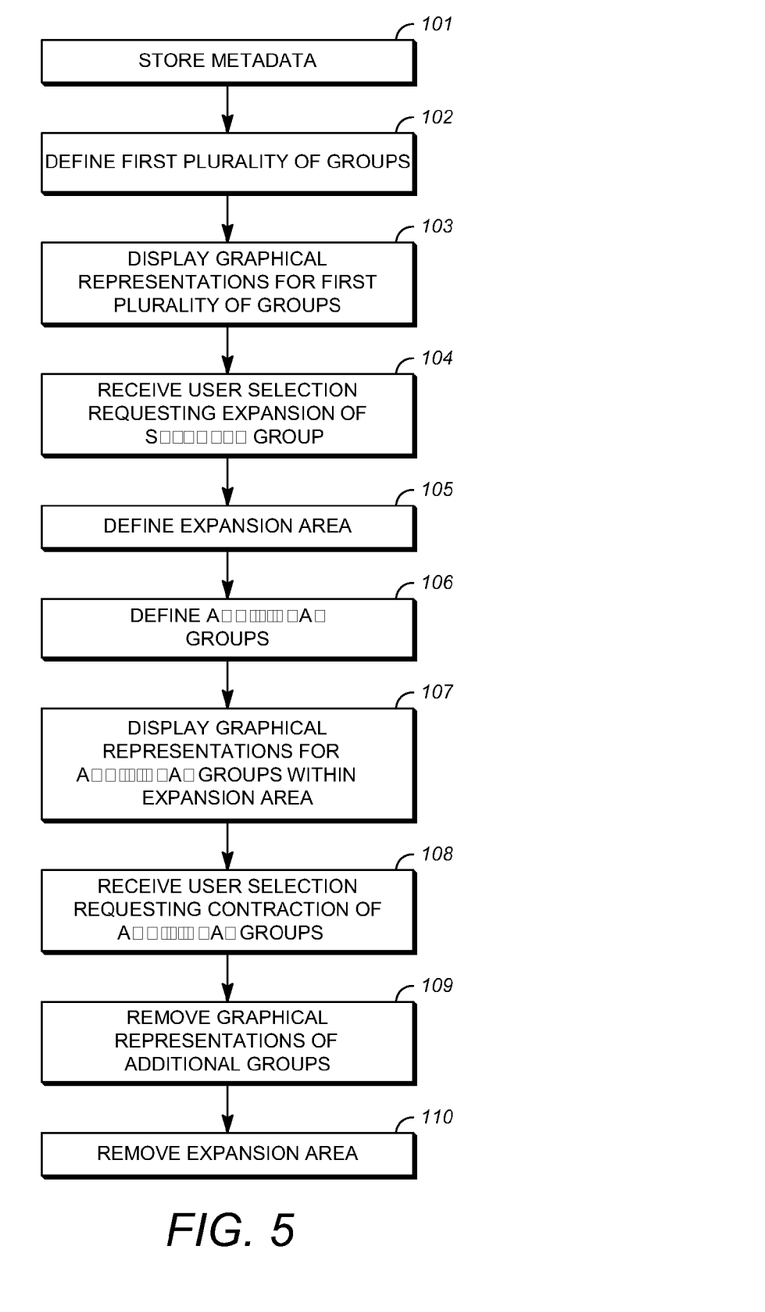
FIG. 5 is a flowchart showing an example of a process for in place expansion of aggregated views.

An example of a process for in-place expansion of an aggregated view will be explained with reference to FIG. 5. The process can be performed by execution of the library manager 32 by a processor, such as the CPU 16 of the device 15.

Initially, in operation 101, the metadata attributes 30 regarding the audio files 28 can be stored, such as at the storage device 24 of the device 15 or at the ROM 18 of the device 15. Each respective metadata attribute from the plurality of metadata attributes 30 can include metadata information for a respective audio file from the plurality of audio files 28. The metadata attributes 30 can describe a respective first metadata attribute and a respective second metadata attribute of each of the audio files 28. As an example, the first metadata attribute can describe an artist name that is associated with each of the audio files 28, and the second metadata attribute can describe an album name that is associated with each of the audio files 28. As another example, the first metadata attribute can describe an album name that is associated with each of the audio files 28, and the second metadata attribute can describe a track name that is associated with each of the audio files 28.

In operation 102, the library manager 32 defines a first plurality of groups of the audio files 28 based on the respective first metadata attribute for each audio file of the audio files 28. As an example, the library manager 32 can define the plurality of artist-level groups 44 based on the artist name that is described by the metadata for each of the audio files 28, for example, by grouping the audio files 28 on the basis of matching metadata attributes. To the extent that the metadata attribute in question is absent or not defined for one or more of the audio files 28, those audio files 28 are grouped together based on absence of the metadata attribute in question.

In operation 103, the library manager 32 causes a graphical representation to be displayed for each group of the audio files 28 from the first plurality of groups of the audio files 28. As an example, this could be a graphical representation in the form of an album cover image corresponding to one or more albums that are included within each of the artist-level groups 44.

In operation 104, the library manager 32 receives a user selection of a first group of the audio files 28, from the first plurality of groups of the audio files 28. For example, the user selection can be a request for expansion of the selected group 46, which is the artist-level group 44 of the plurality of artist level groups 44 that has been designated by the user selection.

In operation 105, the library manager 32 can define the expansion area 50. The expansion area 50 can be defined adjacent to selected location. The expansion area 50 can be defined by moving the graphical representations that correspond to at least some of the artist-level groups 44 away from the selected location, for example, from respective original locations to respective final locations. As an example, the artist-level groups 44 that appear subsequent to the selected group 46 in the aggregated view can be moved to define the expansion area 50.

In operation 106, the library manager 32 defines one or more additional groups of audio files of the plurality of audio files 28. The one or more additional groups can be subgroups of the selected group 36, and the subgroups can be defined based at least in part on the respective second metadata attribute of each of the audio files 28 that is included within the selected group 46. As an example, the second metadata attribute can be an album name attribute, and thus, each of the groups of the second plurality of groups can represent audio files 28 having metadata attributes 30 that defines the same value for both the artist name and album name attributes.

In operation 107, the library manager 32 causes a respective graphical representation of each group from the one or more additional groups, for example, the album-level groups 52, to be displayed within the expansion area 50.

In operation 108, the library manager 32 receives user selection regarding the one or more additional groups, such as an input that requests contraction of the one or more additional groups. In response, in operation 109, the library manager 32 removes the graphical representation of each group of the one or more additional groups, namely, the album-level groups 52. The library manager 32 then moves the graphical representations of the subgroup, in this example, the artist-level groups 44 appearing after the selected group 46, toward the selected location to remove the expansion area 50.

While the description herein is made with reference to the audio files 28, the library manager 32 can be utilized to aggregated views for files other than audio files. For example, videos, documents, or any other type of files that can be grouped on the basis of metadata attributes can be displayed, and organized using the library manager 32 in the same manner described with respect to the audio files 28.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer may include software in the form of programmable code, micro code, and or firmware or other hardware embedded logic. A computer may include multiple processors that operate in parallel. The processing performed by a computer may be distributed among multiple separate devices, and the term computer encompasses all such devices when configured to perform in accordance with the disclosed examples.

While this disclosure includes what is presently considered to be the most practical and preferred embodiment, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
   outputting, by a computing device and for display, a first graphical representation corresponding to a first group of one or more files from a plurality of files and a second graphical representation corresponding to a second group of one or more files from the plurality of files, wherein the first group is defined based on a first metadata attribute value associated with each file in the first group;
   receiving, at the computing device, a user selection of only the first graphical representation, the user selection indicating a requested expansion of the first group, wherein the first graphical representation is displayed at a first display location; and
   in response to receiving the user selection of only the first graphical representation:
      removing the first graphical representation from display,
      moving the second graphical representation from a second display location to a third display location, thereby defining an expansion area adjacent to the first display location, and
      outputting, within the expansion area, at least one additional graphical representation corresponding to a subgroup of the first group, wherein the subgroup is defined based at least in part on a second metadata attribute value associated with each file in the subgroup.

2. The method of claim 1, wherein the user selection is a first user selection, further comprising:
   receiving a second user selection, the second user selection indicated a requested contraction of the first group;
   removing the at least one additional graphical representation from display in response to the second user selection;
   moving the second group to remove the expansion area from display; and
   in response to receiving the second user selection, outputting, for display, the first graphical representation.

3. The method of claim 1, wherein the first metadata attribute value describes an artist name associated with each file in the first group and the second metadata attribute value describes an album name associated with each file in the subgroup.

4. The method of claim 1, wherein the first metadata attribute value describes an album name associated with each file in the first group and the second metadata attribute value describes a track name associated with each file in the subgroup.

5. The method of claim 1, wherein the first graphical representation and the second graphical representation are included in a plurality of graphical representations that are arranged in a rectangular grid.

6. The method of claim 1, wherein the first graphical representation, the second graphical representation, and the at least one additional graphical representation each include album cover art.

7. The method of claim 1, wherein moving the second graphical representation includes outputting, for display, an animated transition of the second graphical representation from the second display location to the third display location.

8. An apparatus, comprising:
an input device;
a memory;
a processor; and
a library manager, executed by the processor, the library manager operable to:
output, for display, a first graphical representation corresponding to a first group of one or more files from a plurality of files and a second graphical representation corresponding to a second group of one or more files from the plurality of files, wherein the first group is defined based on a first metadata attribute value associated with each file in the first group;
receive, at the input device, a user selection of only the first graphical representation, the user selection indicating a requested expansion of the first group, wherein the first graphical representation is displayed at a first display location; and
in response to receiving the user selection of only the first graphical representation:
remove the first graphical representation from display,
move the second graphical representation from a second display location to a third display location, thereby defining an expansion area adjacent to the first display location, and
output, within the expansion area, at least one additional graphical representation corresponding to a subgroup of the first group, wherein the subgroup is defined based at least in part on a second metadata attribute value associated with each file in the subgroup.

9. The apparatus of claim 8, wherein the user selection is first user selection and the library manager is further operable to:
receive a second user selection, the second user selection indicating a requested contraction of the first group,
remove the at least one additional graphical representation from display in response to the second user selection,
move the second group to remove the expansion area from display, and
in response to receiving the second user selection, output, for display, the first graphical representation.

10. The apparatus of claim 8, wherein the first metadata attribute value describes an artist name associated with each file in the first group and the second metadata attribute value describes an album name associated with each file in the subgroup.

11. The apparatus of claim 8, wherein the first metadata attribute value describes an album name associated with each file in the first group and the second metadata attribute value describes a track name associated with each file in the subgroup.

12. The apparatus of claim 8, wherein the first graphical representation and the second graphical representation are included in a plurality of graphical representations that are arranged in a rectangular grid.

13. The apparatus of claim 8, wherein the first graphical representation, the second graphical representation, and the at least one additional graphical representation each include album cover art.

14. The apparatus of claim 8, wherein moving the second graphical representation includes outputting, for display, an animated transition of the second graphical representation from the second display location to the third display location.

15. A non-transitory computer readable medium including program instructions executable by one or more processors that, when executed, cause the one or more processors to perform operations comprising:
outputting, by a computing device and for display, a first graphical representation corresponding to a first group of one or more files from a plurality of files and a second graphical representation corresponding to a second group of one or more files from the plurality of files, wherein the first group is defined based on a first metadata attribute value associated with each file in the first group;
receiving a user selection of only the first graphical representation, the user selection indicating a requested expansion of the first group, wherein the first graphical representation is displayed at a first display location; and
in response to receiving the user selection of only the first graphical representation:
removing the first graphical representation from display;
moving the second graphical representation from a second display location to a third display location, thereby defining an expansion area adjacent to the first display location, and
outputting, within the expansion area, at least one additional graphical representation corresponding to a subgroup of the first group, wherein the subgroup is defined based at least in part on a second metadata attribute value associated with each file in the subgroup.

16. The non-transitory computer readable medium of claim 15, wherein the user selection is a first user selection, further comprising:
receiving a second user selection, the second user selection indicating a requested contraction of the first group;
removing the at least one additional graphical representation from display in response to the second user selection;
moving the second group to remove the expansion area from display; and
in response to receiving the second user selection, outputting, for display at display, the first graphical representation.

17. The non-transitory computer readable medium of claim 15, wherein the first metadata attribute value describes an artist name associated with each file in the first group and the second metadata attribute value describes an album name associated with each file in the subgroup.

18. The non-transitory computer readable medium of claim 15, wherein the first metadata attribute value describes an album name associated with each file in the first group and the second metadata attribute value describes a track name associated with each file in the subgroup.

19. The non-transitory computer readable medium of claim 15, wherein the first graphical representation and the second graphical representation are included in a plurality of graphical representations that are arranged in a rectangular grid.

20. The non-transitory computer readable medium of claim 15, wherein the first graphical representation, the second graphical representation, and the at least one additional graphical representation each include album cover art.

21. The non-transitory computer readable medium of claim 15, wherein moving the second graphical representation includes outputting for display, an animated transition of the second graphical representation from the second display location to the third display location.

22. The method of claim 1, wherein the third display location is laterally offset from the second display location.

23. The method of claim 1, wherein the third display location is laterally and vertically offset from the second display location.

24. The method of claim 5, wherein the rectangular grid defines a series of spaces arranged in a left-to-right and up-to-down order, and moving the second graphical representation from the second display location to the third display location includes moving the second graphical representation by at least one successive space with respect to the rectangular grid.

25. A method, comprising:
   outputting, by a computing device and for display, a first graphical representation corresponding to a first group of two or more audio files from a plurality of audio files and a second graphical representation corresponding to a second group of one or more audio files from the plurality of audio files, wherein the first group is defined based on an artist name metadata attribute value associated with each audio file in the first group, the first graphical representation has the appearance of stacked album cover art pictures corresponding to audio files in the first group of two or more audio files, and the first graphical representation and the second graphical representation are included in a plurality of graphical representations that are arranged in a rectangular grid that defines a series of spaces arranged in a left-to-right and up-to-down order;
   receiving, at the computing device, a user selection of only the first graphical representation, the user selection indicating a requested expansion of the first group, wherein the first graphical representation is displayed at a first display location; and
   in response to receiving the user selection of only the first graphical representation:
      removing the first graphical representation from display,
      moving the second graphical representation from a second display location to a third display location by moving the second graphical representation by at least one successive space with respect to the rectangular grid, thereby defining an expansion area adjacent to the first display location, and
      outputting, within the expansion area, at least two additional graphical representations each corresponding to a respective subgroup of the first group, wherein each subgroup is defined based at least in part on an album name metadata attribute value associated with each audio file in the subgroup.

* * * * *